United States Patent
Yoshida et al.

(10) Patent No.: US 7,998,629 B2
(45) Date of Patent: Aug. 16, 2011

(54) METHOD OF OPERATING HYDROGEN AND POWER GENERATING SYSTEM

(75) Inventors: Tetsuya Yoshida, Saitama (JP); Jun Takeuchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 457 days.

(21) Appl. No.: 12/265,301

(22) Filed: Nov. 5, 2008

(65) Prior Publication Data

US 2009/0117421 A1 May 7, 2009

(30) Foreign Application Priority Data

Nov. 5, 2007 (JP) ................................ 2007-287413

(51) Int. Cl.
*H01M 8/06* (2006.01)
(52) U.S. Cl. ........ 429/415; 429/423; 429/430; 429/427; 429/442; 422/187
(58) Field of Classification Search .................. 429/423, 429/415, 417, 410, 427, 430, 442, 422, 443; 422/198, 187; 204/520, 630; 48/65; 60/783
See application file for complete search history.

(56) References Cited

U.S. PATENT DOCUMENTS

| 7,252,900 | B2 | 8/2007 | Ballantine et al. | |
|---|---|---|---|---|
| 2003/0198844 | A1* | 10/2003 | Ukai et al. | 429/20 |
| 2006/0068246 | A1* | 3/2006 | Matsuo et al. | 429/19 |
| 2007/0254195 | A1* | 11/2007 | Ballantine et al. | 429/21 |

FOREIGN PATENT DOCUMENTS

| JP | 2006-351455 | 12/2006 |
|---|---|---|
| JP | 2007-505472 | 3/2007 |

OTHER PUBLICATIONS

Japanese Office Action for Application No. 2007-287413, dated Jan. 19, 2010.

* cited by examiner

*Primary Examiner* — Raymond Alejandro
(74) *Attorney, Agent, or Firm* — Nelson Mullins Riley & Scarborough LLP; Anthony A. Laurentano

(57) ABSTRACT

If the combination fuel cell and ion pump is judged to be operating in a hydrogen generation mode, an input amount of electricity supplied to the combination fuel cell and ion pump is controlled, so as to control an amount of refined hydrogen generated thereby. If the combination fuel cell and ion pump is judged to be operating in an electricity generation mode, an output amount of electricity supplied from the combination fuel cell and ion pump is controlled, so as to control an amount of electricity generated thereby. The input amount of electricity supplied to the combination fuel cell and ion pump, or the output amount of electricity supplied from the combination fuel cell and ion pump, is corrected based on the temperature of a combustor.

6 Claims, 5 Drawing Sheets

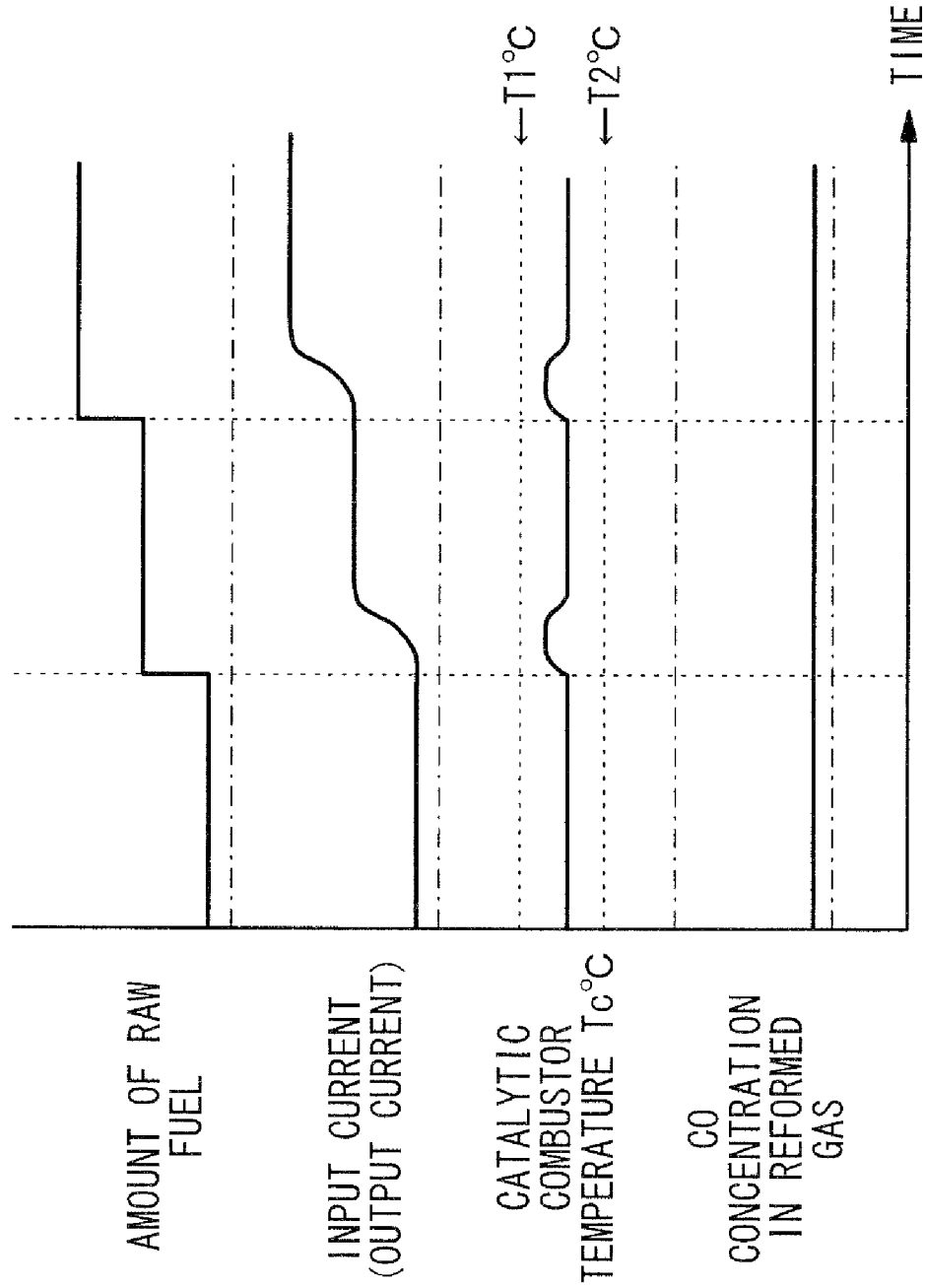

METHOD OF OPERATING HYDROGEN AND POWER GENERATING SYSTEM

BACKGROUND OF THE INVENTION

1. Field of the Invention

The present invention relates to a method of operating a hydrogen and power generation system comprising at least a reforming device and a combination fuel cell and ion pump, wherein the system is selectively operable in a hydrogen generation mode and an electricity generation mode when an anode thereof is supplied with a reformed gas from the reforming device.

2. Description of the Related Art

Fuel cells are a system for generating DC electric energy from an electrochemical reaction caused when anode and cathode are supplied with a fuel gas, i.e., a gas mainly containing hydrogen, and an oxygen-containing gas, i.e., a gas mainly containing oxygen.

For example, a solid polymer electrolyte fuel cell includes a power generation cell having a membrane electrode assembly (MEA), which is sandwiched between separators. The electrolyte electrode assembly comprises an electrolytic membrane in the form of a polymer ion exchange membrane, and anode and cathode that are disposed on respective opposite sides of the electrolytic membrane. Usually, a predetermined number of membrane electrode assemblies and a predetermined number of separators are stacked together in a fuel cell stack, for use in vehicles such as automobiles.

The fuel gas that is supplied to the fuel cells normally comprises hydrogen gas, which is generated from a raw material such as a hydrocarbon material by a reforming device. Generally, the reforming device operates to produce a reform raw gas from a raw hydrocarbon material, such as methane, LNG, or the like, and then to reform the reform raw gas according to a water vapor reforming process, a partial oxidation reforming process, or an automatic thermal reforming process, for thereby generating the reformed gas (fuel gas).

The fuel gas generated by the reforming device needs to be converted into highly pure hydrogen gas (refined hydrogen gas), and may be compressed for storage. To this end, a combination fuel cell and ion pump, as disclosed in Japanese Laid-Open Patent Publication No. 2007-505472 (PCT), is employed.

The combination fuel cell and ion pump comprises an electrochemical cell having an anode inlet for receiving a fuel, an anode outlet for discharging the fuel, a cathode inlet for receiving an oxidizer, a cathode outlet for discharging at least one of the oxidizer, refined oxygen, and refined hydrogen, a first connector, and a second connector, and a controller for supplying electric charges to the first and second connectors in order to cause the electrochemical cell to act as a fuel cell for generating electricity, and for supplying potentials to the first and second connectors to cause the electrochemical cell to act as at least one of a hydrogen pump for refining hydrogen and an oxygen pump for refining oxygen.

The combination fuel cell and ion pump is selectively operable in a hydrogen producing (hydrogen pump) mode and an electricity generating (fuel cell) mode. In either of these modes, the anode outlet discharges an anode off-gas containing unburned hydrogen gas. In order to effectively utilize the unburned hydrogen gas contained in the anode off-gas, the anode off-gas must be supplied to a combustor of the reforming device for evaporating reforming pure water, or be used as a heat source for increasing the temperature of the reform raw fuel.

Temperature variations of the combustor are likely to affect the reaction temperatures of a reforming reaction and a CO shift reaction, thereby tending to increase the CO concentration within the reformed gas, for example. For performing a stable gas reforming reaction, therefore, it is necessary to minimize temperature changes in the combustor insofar as possible.

SUMMARY OF THE INVENTION

An object of the present invention is to provide a method of operating a hydrogen and power generation system, so as to control the temperature of a combustor stably and reliably through a simple process.

According to the present invention, there is provided a method of operating a hydrogen and power generation system including a reforming device for producing a reformed gas by reforming a raw fuel mainly composed of hydrocarbons, the reforming device having a combustor as a heat source, a combination fuel cell and ion pump comprising a electrolyte electrode assembly having an electrolyte and a pair of anode and cathode disposed on respective opposite sides of the electrolyte, the combination fuel cell and ion pump being operable selectively in a hydrogen generation mode for delivering hydrogen in the reformed gas through the electrolyte to the cathode by supplying the reformed gas to the anode while applying a potential between the anode and cathode, and an electricity generation mode for generating electricity by supplying the reformed gas to the anode and supplying an oxygen-containing gas to the cathode while applying a potential between the anode and cathode, and an anode off-gas passage for supplying an anode off-gas discharged from the anode to the combustor.

The method of operating the hydrogen and power generation system comprises the steps of controlling an input amount of electricity supplied to the combination fuel cell and ion pump, so as to control an amount of refined hydrogen generated by the combination fuel cell and ion pump when the combination fuel cell and ion pump operates in the hydrogen generation mode, controlling an output amount of electricity supplied from the combination fuel cell and ion pump, so as to control an amount of electricity generated by the combination fuel cell and ion pump when the combination fuel cell and ion pump operates in the electricity generation mode, detecting a temperature of the combustor, and correcting the input amount of electricity supplied to the combination fuel cell and ion pump, or the output amount of electricity supplied from the combination fuel cell and ion pump, based on the detected temperature.

When the combination fuel cell and ion pump operates in the hydrogen generation mode, the input amount of electricity supplied to the combination fuel cell and ion pump is controlled, so as to control the amount of refined hydrogen generated by the combination fuel cell and ion pump. At the same time, the temperature of the combustor is detected, and the input amount of electricity supplied to the combination fuel cell and ion pump is corrected based on the detected temperature.

When the combination fuel cell and ion pump operates in the electricity generation mode, the output amount of electricity supplied from the combination fuel cell and ion pump is controlled, so as to control the amount of electricity generated by the combination fuel cell and ion pump. At the same time, the temperature of the combustor is detected, and the output amount of electricity supplied from the combination fuel cell and ion pump is corrected based on the detected temperature.

Therefore, in both the hydrogen generation mode and the electricity generation mode, the temperature of the combustor is kept within a predetermined temperature range at all times. As a consequence, the combination fuel cell and ion pump is capable of performing a stable gas reforming reaction through a simple process. Even when the hydrogen and power generation system operates in an unstable period immediately after the system has been activated, the catalytic reaction temperature in the combustor for producing the reformed gas is stabilized. The CO concentration in the reformed gas supplied to the combination fuel cell and ion pump is reduced in order to prevent the combination fuel cell and ion pump from becoming degraded. Since the catalytic reaction temperature is stabilized, the catalyst used in the combustor is prevented from becoming degraded, and hence the catalyst can be used over a long period of time.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a timing chart of an operating method according to the present embodiment.

DESCRIPTION OF THE PREFERRED EMBODIMENT

Figure 1:
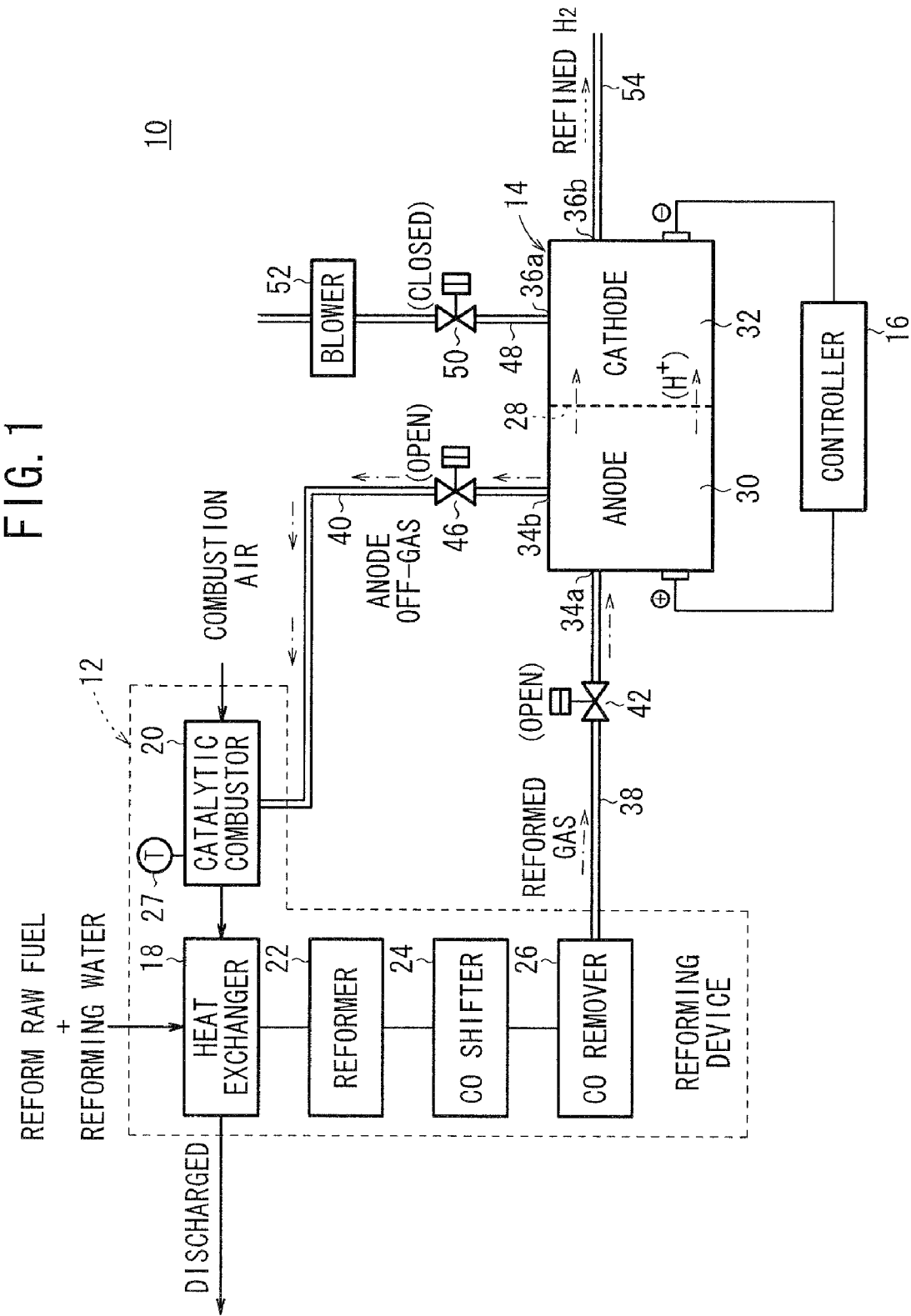
FIG. 1 is a block diagram of a hydrogen and power generation system to which an operating method according to an embodiment of the present invention may be applied.

FIG. 1 shows in block form a hydrogen and power generation system 10 to which an operating method according to an embodiment of the present invention may be applied. The hydrogen and power generation system 10 can be used as a home energy station.

As shown in FIG. 1, the hydrogen and power generation system 10 generally comprises a reforming device 12 for producing a reformed gas by reforming a mixture of a raw fuel (e.g., a city gas) mainly composed of hydrocarbons, and water vapor, a combination fuel cell and ion pump 14 selectively operable an electricity generation mode and a hydrogen generation mode as described later, and a controller 16 connected to the combination fuel cell and ion pump 14, for controlling the hydrogen and power generation system 10 in its entirety.

The reforming device 12 comprises a heat exchanger 18 for producing a mixed fuel by mixing hydrocarbons such as methane ($CH_4$), ethane ($C_2H_6$), propane ($C_3H_8$), and butane ($C_4H_{10}$) contained in the city gas with water vapor, a catalytic combustor 20 for applying heat to the heat exchanger 18 for generating water vapor, a reformer 22 for producing a reformed gas by processing the mixed fuel according to a water vapor reforming process, a CO shifter (shift reactor) 24 for converting carbon monoxide and water vapor contained in the reformed gas into carbon dioxide and hydrogen according to a shift reaction, and a CO remover (selective oxidation reactor) 26 for adding a small amount of air to the reformed gas and reacting selectively absorbed carbon monoxide and oxygen in the air with each other in order to convert the selectively absorbed carbon monoxide into carbon dioxide. The catalytic combustor 20 is connected to a temperature sensor 27 for measuring the temperature of the catalytic combustor 20.

The combination fuel cell and ion pump 14 comprises an electrolyte electrode assembly having a solid polymer electrolytic membrane 28 sandwiched between an anode 30 and a cathode 32. Although not shown, a plurality of membrane electrode assemblies and a plurality of separators are alternately stacked together into a fuel cell stack. The solid polymer electrolytic membrane 28 may comprise, for example, an electrolytic membrane made of a hydrocarbon, or an electrolytic membrane made of fluorine, such as perfluorocarbon or the like.

The combination fuel cell and ion pump 14 has an anode inlet 34a for supplying the reformed gas to the anode 30, an anode outlet 34b for discharging the used reformed gas (anode off-gas) from the anode 30, a cathode inlet 36a for supplying air as an oxygen-containing gas to the cathode 32, and a cathode outlet 36b for discharging the used air from the cathode 32, and also discharging a refined hydrogen gas produced from the reformed gas in the hydrogen generation mode.

The anode inlet 34a and the CO remover 26 of the reforming device 12 are connected to each other by an anode inlet passage 38. The anode outlet 34b and the catalytic combustor 20 of the reforming device 12 are connected to each other by an anode outlet passage (anode off-gas passage) 40. A solenoid-operated valve 42 is connected to the anode inlet passage 38, and a solenoid-operated valve 46 is connected to the anode outlet passage 40.

The cathode inlet 36a is connected to a cathode inlet passage 48. A solenoid-operated valve 50 is connected to the cathode inlet passage 48, and a blower (compressor) 52 also is connected to the cathode inlet passage 48 upstream of the solenoid-operated valve 50. The cathode outlet 36b is connected to a cathode outlet passage 54. The cathode outlet passage 54 is connected at a downstream end thereof to a hydrogen storage station for storing the refined hydrogen gas, and to a hydrogen supply station for supplying the hydrogen gas to a fuel cell vehicle.

Figure 2:
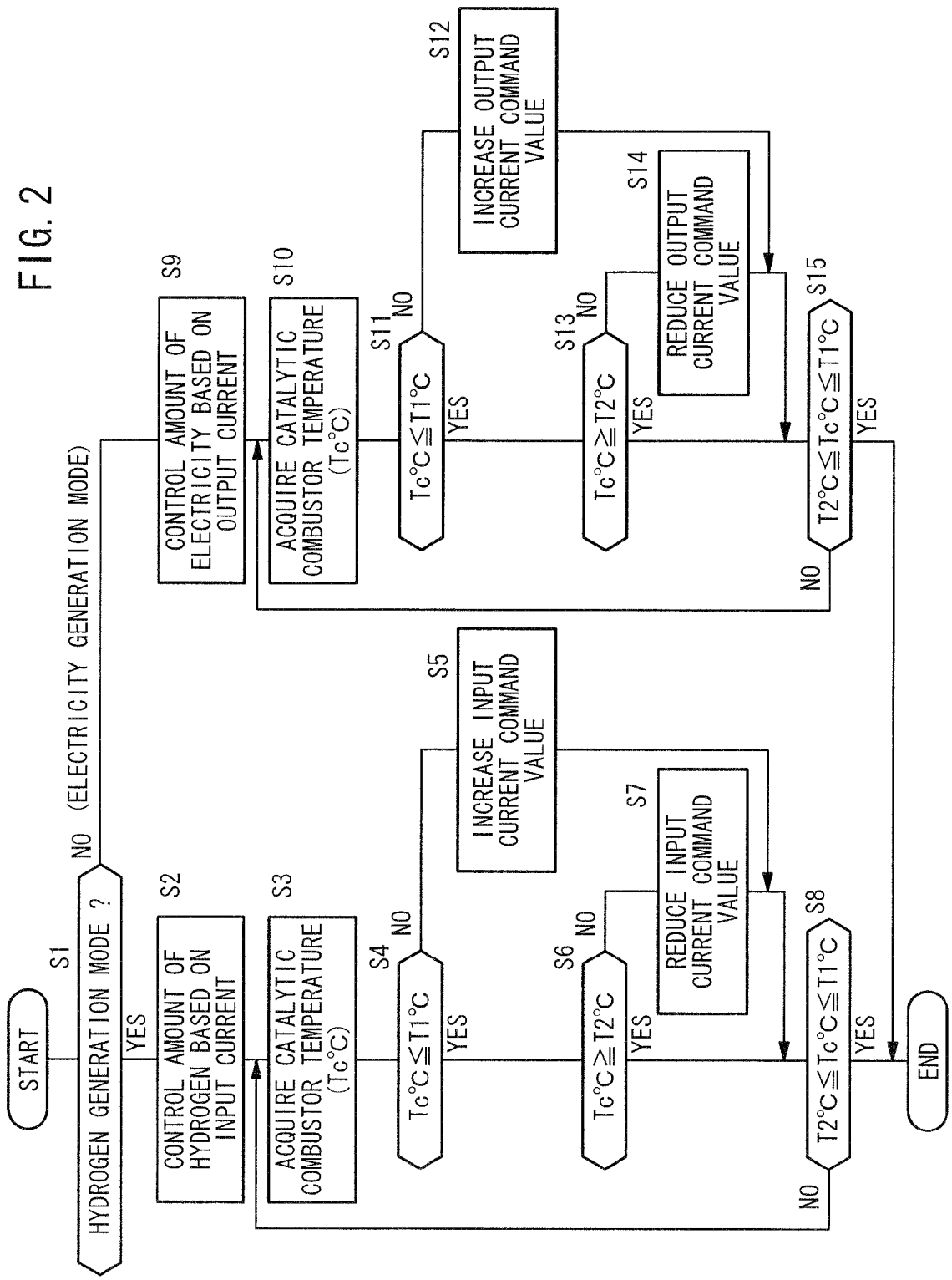
FIG. 2 is a flowchart of the operating method.

Operation of the hydrogen and power generation system 10 will be described below with reference to the flowchart shown in FIG. 2.

First, in step S1, the controller 16 determines whether the combination fuel cell and ion pump 14 is in a hydrogen generation mode or in an electricity generation mode. In step S2, if the controller 16 judges that the combination fuel cell and ion pump 14 is in the hydrogen generation mode, then the controller 16 controls an input electric current (input electric quantity) supplied to the combination fuel cell and ion pump 14 in order to control an amount of refined hydrogen.

Specifically, the heat exchanger 18 of the reforming device 12 is supplied with a raw fuel (reform raw material), such as a city gas or the like, along with reforming water. The heat exchanger 18 also is supplied with combustion heat from the catalytic combustor 20. Therefore, the reforming water supplied to the heat exchanger 18 is evaporated into water vapor, and a mixture of the raw fuel and the water vapor is supplied from the heat exchanger 18 to the reformer 22.

The reformer 22 processes the raw fuel with water vapor according to a water vapor reforming process in order to produce a reformed gas, which is supplied to the CO shifter 24 for carrying out a shift reaction. The reformed gas then is supplied from the CO shifter 24 to the CO remover 26 in order to perform a selective oxidation reaction, from which the reformed gas is introduced into the anode inlet passage 38.

Since the combination fuel cell and ion pump 14 is in the hydrogen generation mode, the controller 16 closes the solenoid-operated valve 50, and applies potentials to the anode 30 and the cathode 32. The reformed gas is supplied from the reforming device 12, through the anode inlet passage 38 and the anode inlet 34a, and to the anode 30. Since the solenoid-operated valve 50 is closed, no air is supplied from the blower 52 to the cathode 32.

At this time, the controller 16 applies a positive potential to the anode 30 and a negative potential to the cathode 32. A reaction represented by $H_2 \rightarrow 2H^+ + 2e^-$ occurs at the anode 30, whereby hydrogen ions ($H^+$) move through the solid polymer electrolytic membrane 28 to the cathode 32. A reaction represented by $2H^+ + 2e^- \rightarrow H_2$ occurs at the cathode 32, during which time the hydrogen is under an increased pressure.

Therefore, protons (hydrogen ions) move from the anode 30 to the cathode 32, whereupon highly pure hydrogen gas is produced. The hydrogen gas then is introduced into the cathode outlet passage 54, which supplies the hydrogen gas to the hydrogen storage station and to the hydrogen supply station.

The reformed gas (containing unburned hydrogen gas) used by the anode 30 is delivered as an unburned gas from the anode outlet 34b, through the anode outlet passage 40, and to the catalytic combustor 20. The unburned gas is burned in the catalytic combustor 20 by combustion air, which is supplied to the catalytic combustor 20.

In step S3, the controller 16 detects the temperature Tc° C. of the catalytic combustor 20 using the temperature sensor 27. If the controller 16 judges that the temperature Tc° C. of the catalytic combustor 20 is in excess of a preset upper limit value T1° C. in step S4 (NO), then in step S5, the controller 16 performs a corrective action in order to increase the input electric current supplied to the combination fuel cell and ion pump 14.

At this time, the catalytic combustor 20 is subject to being excessively heated, because the catalytic combustor 20 is supplied with an excessive amount of unburned gas. When the controller 16 increases the input electric current supplied to the combination fuel cell and ion pump 14, the amount of refined hydrogen produced by the combination fuel cell and ion pump 14 increases, and hence, the consumed amount of reformed gas also increases. Therefore, the amount of unburned gas supplied to the catalytic combustor 20 is reduced, thereby preventing the catalytic combustor 20 from being excessively heated.

If the controller 16 judges that the temperature Tc° C. of the catalytic combustor 20 is equal to or less than the preset upper limit value T1° C. in step S4 (YES), then in step S6, the controller 16 determines whether or not the temperature Tc° C. of the catalytic combustor 20 is equal to or higher than a preset lower limit value T2° C. (<T1° C.). If the controller 16 judges that the temperature Tc° C. of the catalytic combustor 20 is lower than the preset lower limit value T2° C. in step S6 (NO), then in step S7, the controller 16 performs a corrective action to reduce the input electric current supplied to the combination fuel cell and ion pump 14.

Accordingly, the amount of refined hydrogen produced by the combination fuel cell and ion pump 14 is reduced, and hence, the consumed amount of reformed gas also is reduced. Therefore, the amount of unburned gas supplied to the catalytic combustor 20 increases, thereby preventing the temperature of the catalytic combustor 20 from being excessively lowered.

Then, in step S8, the controller 16 determines whether or not the temperature Tc° C. of the catalytic combustor 20 is within a predetermined temperature range (T2° C.≦Tc° C.≦T1° C.). If the controller 16 determines that the temperature Tc° C. exceeds the preset upper limit value T1° C. or is lower than the preset lower limit value T2° C. in step S8 (NO), then the control goes back to step S3.

If the controller 16 judges that the combination fuel cell and ion pump 14 is in the electricity generation mode in step S1 (NO), then in step S9, the controller 16 controls the output electric current (input electric quantity) supplied from the combination fuel cell and ion pump 14 in order to control the amount of generated electricity.

Figure 3:
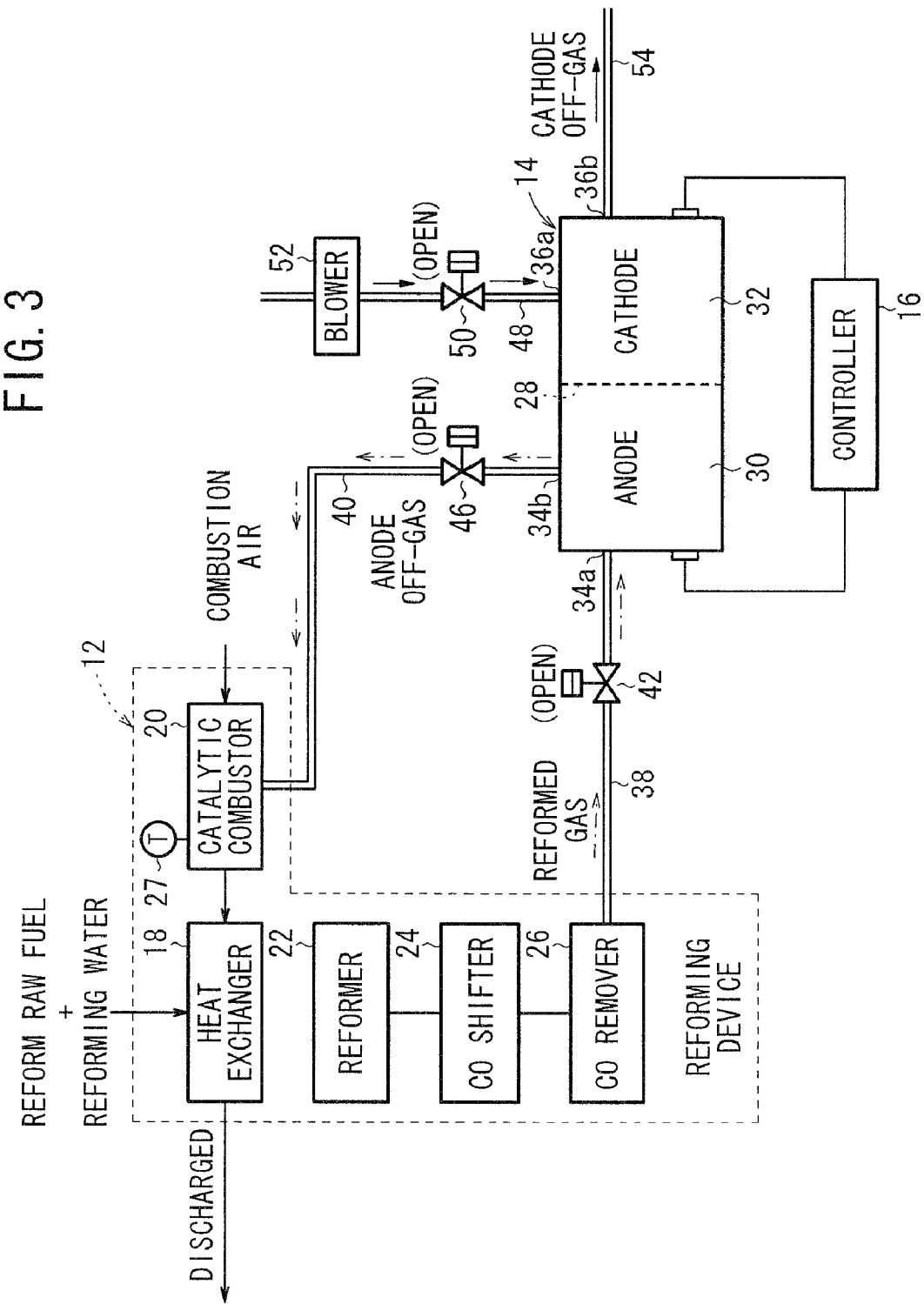
FIG. 3 is a block diagram of the hydrogen and power generation system operating in an electricity generation mode.

Specifically, as shown in FIG. 3, the controller 16 opens the solenoid-operated valve 50, and applies electric charges to the anode 30 and the cathode 32. The reformed gas is supplied from the reforming device 12, through the anode inlet passage 38 and the anode inlet 34a, and to the anode 30. Since the solenoid-operated valve 50 is open, air (oxidizing gas) is supplied from the blower 52 to the cathode 32 through the cathode inlet passage 48.

The combination fuel cell and ion pump 14 generates electricity according to an electrochemical reaction between hydrogen contained in the reformed gas supplied to the anode 30, and oxygen contained in the air supplied to the cathode 32. Electric energy generated by the combination fuel cell and ion pump 14 is used as energy for domestic purposes, for example.

The air used by the cathode 32 is discharged out of the hydrogen and power generation system 10 from the cathode outlet 36b and through the cathode outlet passage 54. The reformed gas (containing unburned hydrogen gas) used by the anode 30 is delivered as an unburned gas from the anode outlet 34b, through the anode outlet passage 40, and to the catalytic combustor 20.

In step S10, the controller 16 detects the temperature Tc° C. of the catalytic combustor 20 using the temperature sensor 27. If the controller 16 judges that the temperature Tc° C. of the catalytic combustor 20 is in excess of the preset upper limit value T1° C. in step S11 (NO), then in step S12, the controller 16 performs a corrective action in order to increase the output electric current supplied from the combination fuel cell and ion pump 14.

When the controller 16 increases the output electric current supplied from (i.e., the amount of electricity generated by) the combination fuel cell and ion pump 14, the consumed amount of reformed gas increases. Therefore, the amount of unburned gas supplied to the catalytic combustor 20 is reduced, thereby preventing the catalytic combustor 20 from being excessively heated.

If the controller 16 judges that the temperature Tc° C. of the catalytic combustor 20 is equal to or lower than the preset upper limit value T1° C. in step S11 (YES), then in step S13, the controller 16 determines whether or not the temperature Tc° C. of the catalytic combustor 20 is equal to or higher than the preset lower limit value T2° C. (<T1° C.). If the controller 16 judges that the temperature Tc° C. of the catalytic combustor 20 is lower than the preset lower limit value T2° C. in step S13 (NO), then in step S14, the controller 16 performs a corrective action in order to reduce the output electric current supplied from the combination fuel cell and ion pump 14.

When the controller 16 reduces the amount of electricity generated by the combination fuel cell and ion pump 14, the consumed amount of reformed gas also is reduced. Therefore, the amount of unburned gas supplied to the catalytic combustor 20 increases, thereby preventing the temperature of the catalytic combustor 20 from being excessively lowered.

Then, the controller 16 determines whether or not the temperature Tc° C. of the catalytic combustor 20 is within the predetermined temperature range (T2° C.≦Tc° C.≦T1° C.). If the controller 16 determines that the temperature Tc° C. exceeds the preset upper limit value T1° C. or is lower than the preset lower limit value T2° C. in step S15 (NO), then the control goes back to step S10.

The amount of reformed gas supplied to the anode inlet 34a generally is thought to be uniquely determined by the amount of reform raw fuel supplied to the reforming device 12. Consequently, it may be considered that the temperature Tc° C. of the catalytic combustor 20 can be stabilized by controlling the input amount of electricity supplied to the combination fuel cell and ion pump 14, and the output amount of electricity supplied from the combination fuel cell and ion pump 14, based on the amount of reform raw fuel supplied to the reforming device 12.

However, when the hydrogen and power generation system 10 is in an unstable period, e.g., immediately after the system has been activated, the overall thermal balance of the hydrogen and power generation system 10 is not stable. During such an unstable period, it is difficult to stabilize the temperature Tc° C. of the catalytic combustor 20 merely by controlling the input amount of electricity supplied to the combination fuel cell and ion pump 14, and the output amount of electricity supplied from the combination fuel cell and ion pump 14, based on the amount of reform raw fuel supplied to the reforming device 12. In addition, during the unstable period, the amount of hydrogen in the reformed gas is unstable, and the amount of unburned gas fluctuates.

Figure 4:
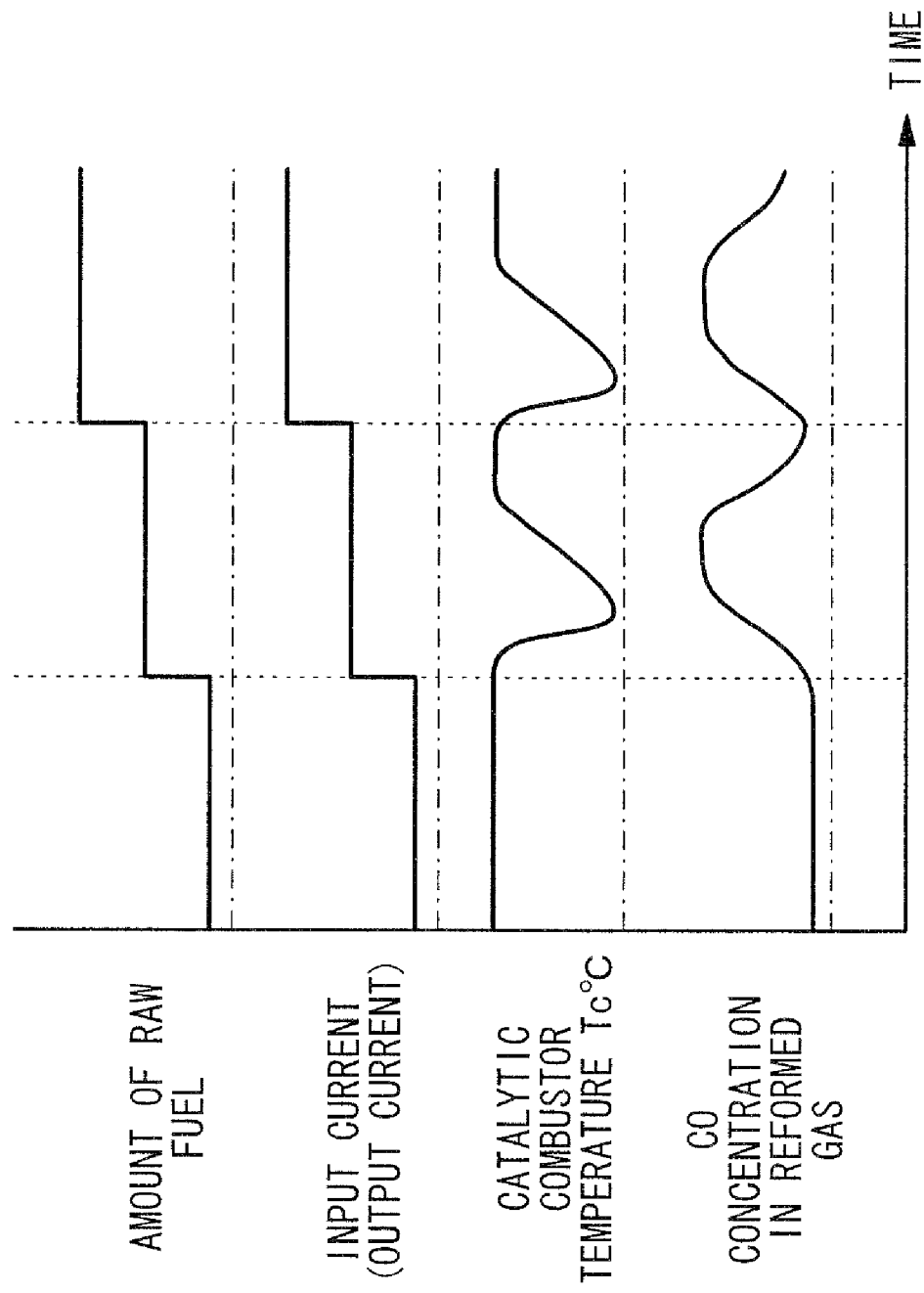
FIG. 4 is a timing chart of an operating method according to a comparative example.

If the input amount of electricity supplied to the combination fuel cell and ion pump 14, and the output amount of electricity supplied from the combination fuel cell and ion pump 14, is controlled based on the amount of reform raw fuel supplied to the reforming device 12, the temperature Tc° C. of the catalytic combustor 20 tends to vary greatly, as shown in FIG. 4, and the CO concentration in the reformed gas supplied to the combination fuel cell and ion pump 14 tends to be unstable. As a result, the combination fuel cell and ion pump 14 becomes degraded by CO poisoning.

According to the present embodiment, the input amount of electricity supplied to the combination fuel cell and ion pump 14, and the output amount of electricity supplied from the combination fuel cell and ion pump 14, is controlled based on the temperature Tc° C. of the catalytic combustor 20. Therefore, in both the hydrogen generation mode and the electricity generation mode, the temperature Tc° C. of the catalytic combustor 20 is kept within a predetermined temperature range (T2° C.≦Tc° C.≦T1° C.) at all times (see FIG. 5).

As a consequence, the combination fuel cell and ion pump 14 is capable of performing a stable gas reforming reaction through a simple process. Even when the hydrogen and power generation system 10 operates in an unstable period immediately after the system has been activated, the catalytic reaction temperature for producing the reformed gas is stabilized. The CO concentration in the reformed gas supplied to the combination fuel cell and ion pump 14 is reduced in order to prevent the combination fuel cell and ion pump 14 from becoming degraded.

Since the catalytic reaction temperature is stabilized, the catalyst used in the catalytic combustor 20 is prevented from becoming degraded, and hence the catalyst can be used over a long period of time.

Although a certain preferred embodiment of the present invention has been shown and described in detail, it should be understood that various changes and modifications may be made to the embodiment without departing from the scope of the invention as set forth in the appended claims.

What is claimed is:

1. A method of operating a hydrogen and power generation system including a reforming device for producing a reformed gas by reforming a raw fuel mainly composed of hydrocarbons, the reforming device having a combustor as a heat source, a combination fuel cell and ion pump comprising an electrolyte electrode assembly having an electrolyte and a pair of anode and cathode disposed on respective opposite sides of the electrolyte, the combination fuel cell and ion pump being operable selectively in a hydrogen generation mode for delivering hydrogen in the reformed gas through the electrolyte to the cathode by supplying the reformed gas to the anode while applying a potential between the anode and cathode, and an electricity generation mode for generating electricity by supplying the reformed gas to the anode and supplying an oxygen-containing gas to the cathode while applying a potential between the anode and cathode, and an anode off-gas passage for supplying an anode off-gas discharged from the anode to the combustor, the method comprising the steps of:

controlling an input amount of electricity supplied to the combination fuel cell and ion pump, so as to control an amount of refined hydrogen generated by the combination fuel cell and ion pump when the combination fuel cell and ion pump operates in the hydrogen generation mode;

controlling an output amount of electricity supplied from the combination fuel cell and ion pump, so as to control an amount of electricity generated by the combination fuel cell and ion pump when the combination fuel cell and ion pump operates in the electricity generation mode;

detecting a temperature of the combustor; and correcting the input amount of electricity supplied to the combination fuel cell and ion pump, or the output amount of electricity supplied from the combination fuel cell and ion pump, based on the detected temperature.

2. A method according to claim 1, wherein the input amount of electricity represents an input electric current supplied to the combination fuel cell and ion pump, and the output amount of electricity represents an output electric current supplied from the combination fuel cell and ion pump.

3. A method according to claim 2, wherein when the combination fuel cell and ion pump operates in the hydrogen generation mode, the input electric current is increased if the temperature of the combustor is in excess of a preset upper limit value.

4. A method according to claim 2, wherein when the combination fuel cell and ion pump operates in the electricity generation mode, the output electric current is increased if the temperature of the combustor is in excess of a preset upper limit value.

5. A method according to claim 2, wherein when the combination fuel cell and ion pump operates in the hydrogen generation mode, the input electric current is reduced if the temperature of the combustor is lower than a preset lower limit value.

6. A method according to claim 2, wherein when the combination fuel cell and ion pump operates in the electricity generation mode, the output electric current is reduced if the temperature of the combustor is lower than a preset upper limit value.

* * * * *